US009481831B2

(12) United States Patent
Bauer et al.

(10) Patent No.: US 9,481,831 B2
(45) Date of Patent: *Nov. 1, 2016

(54) MIXTURES OF FLAME PROTECTION MEANS CONTAINING FLAME PROTECTION MEANS AND ALUMINIUM PHOSPHITES, METHOD FOR PRODUCTION AND USE THEREOF

(71) Applicants: Harald Bauer, Kerpen (DE); Sebastian Hoerold, Diedorf (DE); Martin Sicken, Cologne (DE)

(72) Inventors: Harald Bauer, Kerpen (DE); Sebastian Hoerold, Diedorf (DE); Martin Sicken, Cologne (DE)

(73) Assignee: Clariant International Ltd., Muttenz (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/362,886

(22) PCT Filed: Nov. 28, 2012

(86) PCT No.: PCT/EP2012/004905
§ 371 (c)(1),
(2) Date: Jun. 4, 2014

(87) PCT Pub. No.: WO2013/083247
PCT Pub. Date: Jun. 13, 2013

(65) Prior Publication Data
US 2014/0336325 A1    Nov. 13, 2014

(30) Foreign Application Priority Data
Dec. 5, 2011 (DE) .................. 10 2011 120 200

(51) Int. Cl.
C09K 21/04     (2006.01)
C08K 3/32      (2006.01)
C08K 5/5313    (2006.01)
C09K 21/12     (2006.01)
C09K 21/10     (2006.01)

(52) U.S. Cl.
CPC .............. *C09K 21/04* (2013.01); *C08K 3/32* (2013.01); *C08K 5/5313* (2013.01); *C09K 21/10* (2013.01); *C09K 21/12* (2013.01)

(58) Field of Classification Search
CPC ....................................................... C08K 3/32
USPC ....................................................... 524/414
See application file for complete search history.

(56) References Cited

U.S. PATENT DOCUMENTS

| 3,900,444 | A |   | 8/1975  | Racky et al. |
| 4,036,811 | A |   | 7/1977  | Noetzel et al. |
| 5,256,718 | A | * | 10/1993 | Yamamoto et al. ......... 524/411 |
| 5,780,534 | A |   | 7/1998  | Kleiner et al. |
| 5,965,639 | A | * | 10/1999 | Yamauchi et al. .............. 524/80 |
| 6,136,892 | A | * | 10/2000 | Yamauchi et al. ........... 523/206 |
| 6,207,736 | B1 |  | 3/2001  | Nass et al. |
| 6,255,371 | B1 |  | 7/2001  | Schlosser et al. |
| 6,270,560 | B1 |  | 8/2001  | Kleiner et al. |
| 6,365,071 | B1 |  | 4/2002  | Jenewein et al. |
| 6,509,401 | B1 |  | 1/2003  | Jenewein et al. |
| 7,179,400 | B2 |  | 2/2007  | Frischkemuth et al. |
| 1,725,551 | A1 |  | 8/2007  | Hoerold et al. |
| 7,446,140 | B2 |  | 11/2008 | Bauer et al. |
| 8,362,119 | B2 |  | 1/2013  | Endtner et al. |
| 2003/0173544 | A1 | | 9/2003 | Eichenauer |
| 2004/0225040 | A1 | | 11/2004 | Hoerold |
| 2006/0020064 | A1 | * | 1/2006 | Bauer et al. ................. 524/115 |
| 2006/0214144 | A1 | | 9/2006 | Bauer et al. |
| 2006/0287418 | A1 | * | 12/2006 | Bauer et al. ................. 524/127 |
| 2008/0090950 | A1 | | 4/2008 | Costanzi et al. |
| 2010/0224840 | A1 | * | 9/2010 | Hawkes et al. .............. 252/609 |
| 2011/0021676 | A1 | | 1/2011 | Hoerold et al. |
| 2013/0190432 | A1 | * | 7/2013 | Krause et al. ................ 524/101 |
| 2014/0309339 | A1 | | 10/2014 | Schneider et al. |
| 2014/0309340 | A1 | | 10/2014 | Schneider et al. |
| 2014/0329933 | A1 | | 11/2014 | Schneider et al. |
| 2014/0336325 | A1 | | 11/2014 | Bauer et al. |
| 2014/0350149 | A1 | | 11/2014 | Schneider et al. |
| 2014/0371361 | A1 | | 12/2014 | Bauer et al. |
| 2015/0005421 | A1 | | 1/2015 | Schneider et al. |
| 2015/0005427 | A1 | | 1/2015 | Bauer et al. |
| 2015/0018464 | A1 | | 1/2015 | Bauer et al. |
| 2015/0299419 | A1 | | 10/2015 | Bauer et al. |

FOREIGN PATENT DOCUMENTS

| CA | 2 218 792  | * 10/1997 |
| CA | 2216792    | 4/1998 |
| DE | 2 447 727  | 4/1974 |
| DE | 2 252 258  | 5/1974 |
| DE | 19 614 424 | 10/1997 |
| DE | 19 734 437 | 2/1999 |
| DE | 19 737 727 | 7/1999 |
| DE | 19 920 276 | 11/2000 |
| DE | 19 933 901 | 2/2001 |
| EP | 0 699 708  | 4/1974 |

(Continued)

OTHER PUBLICATIONS

English Machine Translation of JP2899916, printed Feb. 29, 2016.*
English Machine Translation of JP2011-225723, printed Feb. 29, 2016.*
Co-pending U.S. Appl. No. 14/362,884, filed Jun. 4, 2014 by Bauer et al.
PCT international Search Report for PCT/EP2012/004905, mailed May 2, 2013.
PCT International Preliminary Report on Patentability for PCT/EP2012/004905, mailed Jun. 10, 2014.

(Continued)

*Primary Examiner* — Randy Gulakowski
*Assistant Examiner* — Christopher M Rodd
(74) *Attorney, Agent, or Firm* — Anthony A. Bisulca

(57) ABSTRACT

The invention relates to flame retardant mixtures comprising flame retardant and aluminum phosphites, to processes for preparation thereof and to the use thereof.

15 Claims, No Drawings

(56) References Cited

FOREIGN PATENT DOCUMENTS

| | | |
|---|---|---|
| EP | 0 344 321 | 12/1989 |
| EP | 0838493 | 4/1998 |
| EP | 0 896 023 | 2/1999 |
| EP | 0 964 886 | 12/1999 |
| EP | 1 607 400 | 12/2005 |
| EP | 1624015 | 2/2006 |
| EP | 1 705 220 | 9/2008 |
| JP | H 02175604 | 7/1990 |
| JP | 08-198609 | 8/1996 |
| JP | 2899916 B2 * | 6/1999 |
| JP | 2004-331975 | 11/2004 |
| JP | 2008-512525 | 4/2008 |
| JP | 2011-225723 | 11/2011 |
| JP | 2011225723 A * | 11/2011 |
| WO | WO 97/39053 | 10/1997 |
| WO | WO 03/078523 | 9/2003 |
| WO | WO 2004/048453 | 6/2004 |
| WO | WO 2007/007663 | 1/2007 |
| WO | WO 2009/109318 | 9/2009 |
| WO | WO2012/045414 | 4/2012 |
| WO | WO 2012045414 A1 * | 4/2012 |

OTHER PUBLICATIONS

PCT international Search Report for PCT/EP2011/004887, Mailed Mar. 26, 2012.
PCT International Preliminary Report on Patentability for PCT/EP2011/004887, mailed Apr. 9, 2013.
Dr. Hans. Zweifel "Plastics Additives Handbook", 5th Edition, Munich, pp. 80-84, Jan. 1, 2000.
English abstract for DE 19 920 276, Nov. 9, 2000.
English translation of Japanese Office Action for Japanese Patent Application 2013-532062 dated Jun. 19, 2015.
English abstract, for WO 2009/109318, Sep. 11, 2009.
PCT international Search Report for PCT/EP2012/004907, mailed Feb. 4, 2013.
PCT International Preliminary Report on Patentability for PCT/EP2012/004907, mailed Jun. 10, 2014.
English abstract for JPH 02175604, Jul. 6, 1990.
PCT International Search Report for PCT/EP2012/004908 mailed Feb. 4, 2013.
English Translation of PCT International Preliminary Report on Patentability for PCT/EP2012/004908, Jun. 10, 2014.
Morris R. et al. "Synthesis and Structures of Two Isostructural Phosphites, Al2(HP03)3 and Ga2(HPO3)3", ACTA Crystallegraphica Section C. Crystal Structure Communications, Munksgaard, Copenhagen, DK, vol. 50, No. 4: pp. 473-476, Apr. 1, 1994. XP009166285.
PCT International Search Report for PCT/EP2012/004909, mailed Feb. 4, 2013.
English Translation of PCT International Preliminary Report on Patentability for PCT/EP2012/004909, Jun. 10, 2014.
PCT International Search Report for PCT/EP2012/004906, mailed Feb. 4, 2013.
English Translation of PCT International Preliminary Report on Patentability for PCT/EP2012/004906, Jun. 10, 2014.
Yang Yali, Ll Niu, Xiang Shouhe, Guan Naijia, "Hydrothermal synthesis and structure characteristics of single aluminophosphite $[Al_2(HPO_3)_3(H_2O)_3]H_2O$ crystals". Institute of New Catalytic Materials Science, Nankai University, Tianjin 300071, China, pp. 1-6, Oct. 2006.
United States Patent and Trademark Office Office Action for U.S. Appl. No. 14/362,876 dated Sep. 25, 2015.
United States Patent and Trademark Office Office Action for U.S. Appl. No. 14/362,876 dated Feb. 26, 2016.
United States Patent and Trademark Office Office Action for U.S. Appl. No. 13/878,145 dated Nov. 20, 2014.
United States Patent and Trademark Office Office Action for U.S. Appl. No. 13/878,145 dated May 5, 2015.
United States Patent and Trademark Office Office Action for U.S. Appl. No. 13/878,145 dated Dec. 16, 2015.
United States Patent and Trademark Office Office Action for U.S. Appl. No. 14/362,871 dated Jul. 17, 2015.
United States Patent and Trademark Office Office Action for U.S. Appl. No. 14/362,871 dated Jan. 8, 2016.
United States Patent and Trademark Office Office Action for U.S. Appl. No. 14/362,881 dated Sep. 25, 2015.
United States Patent and Trademark Office Notice of Allowance for U.S. Appl. No. 14/362,884 dated Sep. 1, 2015.
United States Patent and Trademark Office Notice of Allowance for U.S. Appl. No. 14/362,884 dated Dec. 4, 2015.
Machine English Translation of JP 08-196609, Aug. 6, 1996.
Machine English Translation of JP 2011-225723, Nov. 10, 2011.

* cited by examiner

MIXTURES OF FLAME PROTECTION MEANS CONTAINING FLAME PROTECTION MEANS AND ALUMINIUM PHOSPHITES, METHOD FOR PRODUCTION AND USE THEREOF

The present invention relates to flame retardant mixtures comprising flame retardant and aluminum phosphites, to processes for preparation thereof and to the use thereof.

The prior art discloses flame retardants which are used alone or together with other components, especially synergists, in a wide variety of different polymers. These synergists, also called flame retardant synergists, need not themselves be flame-retardant, but may significantly enhance the efficacy of flame retardants. Typically, the various components, for example flame retardant, flame retardant synergist, additives and fillers, are mixed by kneading and extrusion with the polymer to be rendered flame-retardant. This is done at temperatures at which the polymer is in molten form and which can distinctly exceed 320° C. for a brief period. All components, especially the flame retardants and the flame retardant synergists, must be able to withstand these temperatures without decomposition, in order to maintain their efficacy, i.e. the flame retardancy here, and to obtain a flame-retardant polymer mixture.

It has been found that, surprisingly, the inventive mixtures of flame retardants with aluminum phosphites are much more thermally stable than when flame retardant alone or aluminum phosphites alone are used. A synergistic effect of the mixtures claimed is also found when they display their action as flame retardants.

The invention therefore relates to flame retardant mixtures comprising flame retardant and aluminum phosphites.

The flame retardant preferably comprises dialkylphosphinic acids and/or salts thereof; condensation products of melamine and/or reaction products of melamine with phosphoric acid and/or reaction products of condensation products of melamine with polyphosphoric acid or mixtures thereof; nitrogen-containing phosphates of the formulae $(NH_4)_y H_{3-y} PO_4$ or $(NH_4 PO_3)_z$, where y is 1 to 3 and z is 1 to 10 000; benzoguanamine, tris(hydroxyethyl) isocyanurate, allantoin, glycoluril, melamine, melamine cyanurate, dicyandiamide and/or guanidine; magnesium oxide, calcium oxide, aluminum oxide, zinc oxide, manganese oxide, tin oxide, aluminum hydroxide, boehmite, dihydrotalcite, hydrocalumite, magnesium hydroxide, calcium hydroxide, zinc hydroxide, tin oxide hydrate, manganese hydroxide, zinc borate, basic zinc silicate and/or zinc stannate.

The dialkylphosphinic acids or salts thereof preferably correspond to the formula (IV)

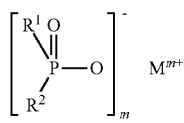

in which
R¹, R² are the same or different and are each linear or branched $C_1$-$C_6$-alkyl;
M is Mg, Ca, Al, Sb, Sn, Ge, Ti, Fe, Zr, Zn, Ce, Bi, Sr, Mn, Li, Na, K, H and/or a protonated nitrogen base;
m is 1 to 4.

The flame retardant preferably also comprises melam, melem, melon, dimelamine pyrophosphate, melamine polyphosphate, rnelam polyphosphate, melon polyphosphate and/or melem polyphosphate and/or mixed poly salts thereof and/or ammonium hydrogenphosphate, ammonium dihydrogenphosphate and/or ammonium polyphosphate.

The flame retardant preferably also comprises aluminum hypophosphite, zinc hypophosphite, calcium hypophosphite, sodium phosphite, monophenylphosphinic acid and salts thereof, mixtures of dialkylphosphinic acids and salts thereof and monoalkylphosphinic acids and salts thereof, 2-carboxyethylalkylphosphinic acid and salts thereof, 2-carboxyethylmethylphosphinic acid and salts thereof, 2-carboxyethylarylphosphinic acid and salts thereof, 2-carboxyethylphenylphosphinic acid and salts thereof, oxa-10-phosphaphenanthrene (DOPO) and salts thereof and adducts onto para-benzoquinone, or itaconic acid and/or salts thereof.

The aluminum phosphites are preferably those of the formulae (I), (II) and/or (III)

in which
q is 0 to 4,

in which
M represents alkali metal ions
z is 0.01 to 1.5
y is 2.63 to 3.5
v is 0 to 2 and w is 0 to 4,

in which
u is 2 to 2.99,
t is 2 to 0.01 and
s is 0 to 4,
and/or mixtures of aluminum phosphite of the formula (I) with sparingly soluble aluminum salts and nitrogen-free extraneous ions, mixtures of aluminum phosphite of the formula (III) with aluminum salts, aluminum phosphite [Al(H2PO$_3$)$_3$], secondary aluminum phosphite [Al$_2$(HPO$_3$)$_3$], basic aluminum phosphite [Al(OH)(H$_2$PO$_3$)$_2$*2aq], aluminum phosphite tetrahydrate [Al$_2$(HPO$_3$)$_3$*4aq], aluminum phosphonate, Al$_7$(HPO$_3$)$_9$(OH)$_6$(1,6-hexanediamine)$_{1.5}$*12H$_2$O, Al$_2$(HPO$_3$)$_3$*xAl$_2$O$_3$*nH$_2$O where x=2.27–1 and/or Al$_4$H$_6$P$_{16}$O$_{18}$.

Preferably, in the aluminum phosphite of the formula (I), q is 0.01 to 0.1.

Preferably, in the aluminum phosphite of the formula (II), z is 0.15 to 0.4
y is 2.80 to 3
v is 0.1 to 0.4 and
w is 0.01 to 0.1.

Preferably, in the aluminum phosphite of the formula (III),
u is 2.834 to 2.99
t is 0.332 to 0.03 and
s is 0.01 to 0.1.

The invention also relates to flame retardant mixtures as claimed in one or more of claims 1 to 9, comprising 0.1 to 99.9% by weight of flame retardant and 0.1 to 99.9% by weight of aluminum phosphites of the formulae (I), (II) and/or (III) and/or mixtures of aluminum phosphite of the formula (I) with sparingly soluble aluminum salts and nitrogen-free extraneous ions and/or mixtures of aluminum phosphite of the formula (III) with aluminum salts.

The flame retardant mixtures preferably comprise 50 to 99.9% by weight of flame retardant and 0.1 to 50% by weight of aluminum phosphites of the formulae (I), (II) and/or (III) and/or mixtures of aluminum phosphite of the formula (I) with sparingly soluble aluminum salts and nitrogen-free extraneous ions and/or mixtures of aluminum phosphite of the formula (III) with aluminum salts.

The invention also relates to a process for preparing flame retardant mixtures as claimed in one or more of claims 1 to 11, which comprises mixing pulverulent flame retardants with pulverulent aluminum phosphites of the formulae (I), (II) and/or (III) and/or mixtures of aluminum phosphite of the formula (I) with sparingly soluble aluminum salts and nitrogen-free extraneous ions and/or mixtures of aluminum phosphite of the formula (III) with aluminum salts.

The invention also relates to the use of flame retardant mixtures as claimed in one or more of claims 1 to 11 as an intermediate for further syntheses, as a binder, as a crosslinker or accelerator in the curing of epoxy resins, polyurethanes, unsaturated polyester resins, as polymer stabilizers, as crop protection compositions, as sequestrants, as a mineral oil additive, as an anticorrosive, in washing and cleaning composition applications, in electronics applications.

Preference is given to the use of flame retardant mixtures as claimed in one or more of claims 1 to 11 in or as a flame retardant, especially in or as a flame retardant for clearcoats and intumescent coatings, in or as a flame retardant for wood and other cellulosic products, in or as a reactive and/or nonreactive flame retardants for polymers, for production of flame-retardant polymer molding compositions, for production of flame-retardant polymer moldings and/or for rendering polyester and pure and blended cellulose fabrics flame-retardant by impregnation, and/or as a synergist and/or as a synergist in further flame retardant mixtures.

The invention also encompasses flame-retardant thermoplastic or thermoset polymer molding compositions or polymer moldings, films, filaments and/or fibers comprising 0.1 to 45% by weight of flame retardant mixtures as claimed in one or more of claims 1 to 11, 55 to 99.9% by weight of thermoplastic or thermoset polymer or mixtures thereof, 0 to 55% by weight of additives and 0 to 55% by weight of filler or reinforcing materials, where the sum of the components is 100% by weight.

The invention relates to preferably flame-retardant thermoplastic or thermoset polymer molding compositions or polymer moldings, films, filaments and/or fibers comprising 1 to 30% by weight of flame retardant mixtures as claimed in one or more of claims 1 to 11, 10 to 97% by weight of thermoplastic or thermoset polymer or mixtures thereof, 1 to 30% by weight of additives and 1 to 30% by weight of filler or reinforcing materials, where the sum of the components is 100% by weight.

The polymer in the flame-retardant thermoplastic or thermoset polymer molding composition or polymer moldings, films, filaments and/or fibers preferably comprises thermoplastic polymers of the HI (high-impact) polystyrene, polyphenylene ether, polyamide, polyester or polycarbonate type, and blends or polymer blends of the ABS (acrylonitrile-butadiene-styrene) or PC/ABS (polycarbonate/acrylonitrile-butadiene-styrene) or PPE/HIPS (polyphenylene ether/HI polystyrene) polymer type, and/or thermoset polymers of the unsaturated polyester or epoxy resin type.

The inventive mixtures preferably have a particle size of 0.1 to 1000 μm.

The inventive mixtures preferably have a bulk density of 80 to 800 g/l, more preferably of 200 to 700 g/l.

The inventive mixtures preferably have an L color value of 85 to 99.9, more preferably of 90 to 98.

The inventive mixtures preferably have an a color value of −4 to +9, more preferably of −2 to +6.

The inventive mixtures preferably have a b color value of −2 to +6, more preferably of −1 to +3.

The color values are reported in the Hunter system (CIE-LAB system, Commission Internationale d'Eclairage). L values range from 0 (black) to 100 (white), a values from −a (green) to +a (red), and b values from −b (blue) to +b (yellow).

Preferred dialkylphosphinic salts are aluminum trisdiethylphosphinate, aluminum trismethylethylphosphinate, titanyl bisdiethylphosphinate, titanium tetrakisdiethylphosphinate, titanyl bismethylethylphosphinate, titanium tetrakismethylethylphosphinate, zinc bisdiethylphosphinate, zinc bismethylethylphosphinate and mixtures thereof.

The inventive mixtures in principle also include mixtures of one or more flame retardants with one or more aluminum phosphites, i.e. three-, four- or multicomponent mixtures are possible.

Preferred polymer additives for flame-retardant polymer molding compositions and flame-retardant polymer moldings are UV absorbers, light stabilizers, lubricants, colorants, antistats, nucleating agents, fillers, reinforcing aaents and/or synergists.

Preference is given in accordance with the invention to the use of the inventive flame-retardant polymer moldings as lamp components such as lamp fittings and holders, plugs and multisocket extensions, bobbins, housing for capacitors and contactors, and circuit breakers, relay housing and reflectors.

The invention also relates to intumescent flame-retardant coating comprising 1 to 50% of the inventive flame retardant mixtures comprisina flame retardant and aluminum phosphites, 0 to 60% ammonium polyphosphate and 0 to 80% by weight of binder, foam former, fillers and/or polymer additives.

In the mixtures of aluminum phosphite of the formula (I) with sparingly soluble aluminum salts and nitrogen-free extraneous ions, the sparingly soluble aluminum salts are preferably aluminum hydroxide, aluminum hydroxychloride, polyaluminum hydroxyl compounds, aluminum carbonates, hydrotalcites ($Mg_6Al_2(OH)_{16}CO_3*nH_2O$), dihydroxyaluminum sodium carbonate ($NaAl(OH)_2CO_3$), aluminum oxides, aluminum oxide hydrate, mixed aluminum oxide hydroxides, basic aluminum sulfate and/or alunite, and the extraneous ions are preferably chlorides, complex chlorides, bromides; hydroxides, peroxides, peroxide hydrates, sulfites, sulfates, sulfate hydrates, acidic sulfates, hydrogensulfates, peroxosulfates, peroxodisulfates; nitrates; carbonates, percarbonates, stannates; borates, perborates, perborate hydrates; formates, acetates, propionates, lactates and/or ascorbates and/or cations of the elements Li, Na, K, Mg, Ca, Ba, Pb, Sn, Cu, Zn, La, Ce, Ti, Zr, V, Cr, Mn, Fe, Co and/or Ni.

The aluminum salts in the mixtures of aluminum phosphite of the formula (III) with aluminum salts are preferably aluminum metal, aluminum alloys, oxides, hydroxides, peroxides, peroxide hydrates, carbonates, percarbonates, mixed carbonates/hydrates, formates, acetates, propionates, stearates, lactates, ascorbates, oxalates, or aluminum salts with anions of acids having a higher vapor pressure than phosphorous acid.

The polymers preferably originate from the group of the thermoplastic polymers such as polyester, polystyrene or polyamide, and/or the thermoset polymers.

The polymers are preferably polymers of mono- and diolefins, for example polypropylene, polyisobutylene, polybutene-1, poly-4-methylpentene-1, polyisoprene or polybutadiene, and addition polymers of cycloolefins, for example of cyclopentene or norbornene; and also polyethylene (which may optionally be crosslinked), e.g. high-density polyethylene (HDPE), high-density high-molar mass polyethylene (HDPE-HMW), high-density ultrahigh-molar mass polyethylene (HDPE-UHMW), medium-density polyethylene (MDPE), low-density polyethylene (LOPE), linear low-density polyethylene (LLDPE), branched low-density polyethylene (BLDPE), and mixtures thereof.

The polymers are preferably copolymers of mono- and diolefins with one another or with other vinyl monomers, for example ethylene-propylene copolymers, linear low-density polyethylene (LLDPE) and mixtures thereof with low-density polyethylene (LDPE), propylene-butene-1 copolymers, propylene-isobutylene copolymers, ethylene-butene-1 copolymers, ethylene-hexene copolymers, ethylene-methylpentene copolymers, ethylene-heptene copolymers, ethylene-octene copolymers, propylene-butadiene copolymers, isobutylene-isoprene copolymers, ethylene-alkyl acrylate copolymers, ethylene-alkyl methacrylate copolymers, ethylene-vinyl acetate copolymers and copolymers thereof with carbon monoxide, or ethylene-acrylic acid copolymers and salts thereof (ionomers), and also terpolymers of ethylene with propylene and a diene such as hexadiene, dicyclopentadiene or ethylidenenorbornene; and also mixtures of such copolymers with one another, e.g. polypropylene/ethylene-propylene copolymers, LDPE/ethylene-vinyl acetate copolymers, LDPE/ethylene-acrylic acid copolymers, LLDPE/ethylene-vinyl acetate copolymers, LLDPE/ethylene-acrylic acid copolymers and alternating or random polyalkylene/carbon monoxide copolymers and mixtures thereof with other polymers, for example polyamides.

The polymers are preferably hydrocarbon resins (e.g. $C_5$-$C_9$), including hydrogenated modifications thereof (e.g. tackifier resins) and mixtures of polyalkylenes and starch.

The polymers are preferably polystyrene (Polystyrol® 143E (BASF)), poly(p-methylstyrene), poly(alpha-methylstyrene).

The polymers are preferably copolymers of styrene or alpha-methylstyrene with diener or acrylic derivatives, for example styrene-butadiene, styrene-acrylonitrile, styrene-alkyl methacrylate, styrene-butadiene-alkyl acrylate and methacrylate, styrene-maleic anhydride, styrene-acrylonitrile-methyl acrylate; more impact-resistant mixtures of styrene copolymers and another polymer, for example a polyacrylate, a diene polymer or an ethylene-propylene-diene terpolymer; and block copolymers of styrene, for example styrene-butadiene-styrene, styrene-isoprene-styrene, styrene-ethylene/butylene-styrene or styrene-ethylene/propylene-styrene.

The polymers are preferably graft copolymers of styrene or alpha-methylstyrene, for example styrene onto polybutadiene, styrene onto polybutadiene-styrene or polybutadiene-acrylonitrile copolymers, styrene and acrylonitrile (or methacrylonitrile) onto polybutadiene; styrene, acrylonitrile and methyl methacrylate onto polybutadiene; styrene and maleic anhydride onto polybutadiene; styrene, acrylonitrile and maleic anhydride or maleimide onto polybutadiene; styrene and maleimide onto polybutadiene, styrene and alkyl acrylates or alkyl methacrylates onto polybutadiene, styrene and acrylonitrile onto ethylene-propylene-diene terpolymers, styrene and acrylonitrile onto polyalkyl acrylates or polyalkyl methacrylates, styrene and acrylonitrile onto acrylate-butadiene copolymers, and mixtures thereof, as known, for example, as ABS, MBS, ASA or AES polymers.

The styrene polymers are preferably comparatively coarse-pore foam such as EPS (expanded polystyrene), e.g. Styropor (BASF) and/or foam with relatively fine pores such as XPS (extruded rigid polystyrene foam), e.g. Styrodur® (BASF). Preference is given to polystyrene foams, for example Austrotherm® XPS, Styrofoam® (Dow Chemical), Floormate®, Jackodur®, Lustron®, Roofmate®, Styropor, Styrodur®, Styrofoam®, Sagex® and Telgopor®.

The polymers are preferably halogenated polymers, for example polychloroprene, chlorine rubber, chlorinated and brominated copolymer of isobutylene-isoprene (halobutyl rubber), chlorinated or chlorosulfonated polyethylene, copolymers of ethylene and chlorinated ethylene, epichlorohydrin home- and copolymers, especially polymers of halogenated vinyl compounds, for example polyvinyl chloride, polyvinylidene chloride, polyvinyl fluoride, polyvinylidene fluoride; and copolymers thereof, such as vinyl chloride-vinylidene chloride, vinyl chloride-vinyl acetate or vinylidene chloride-vinyl acetate.

The polymers are preferably polymers which derive from alpha,beta-unsaturated acids and derivatives thereof, such as polyacrylates and polymethacrylates, polymethyl methacrylates, polyacrylamides and polyacrylonitriles impact-modified with butyl acrylate, and copolymers of the monomers mentioned with one another or with other unsaturated monomers, for example acrylonitrile-butadiene copolymers, acrylonitrile-alkyl acrylate copolymers, acrylonitrile-alkoxyalkyl acrylate copolymers, acrylonitrile-vinyl halide copolymers or acrylonitrile-alkyl methacrylate-butadiene terpolymers.

The polymers are preferably polymers which derive from unsaturated alcohols and amines or the acyl derivatives or acetals thereof, such as polyvinyl alcohol, polyvinyl acetate, stearate, benzoate or maleate, polyvinyl butyral, polyallyl phthalate, polyallylmelamine; and copolymers thereof with olefins.

The polymers are preferably homo- and copolymers of cyclic ethers, such as polyalkylene glycols, polyethylene oxide, polypropylene oxide or copolymers thereof with bisglycidyl ethers.

The polymers are preferably polyacetals such as polyoxymethylene, and those polyoxymethylenes which contain comonomers, for example ethylene oxide; polyacetals which have been modified with thermoplastic polyurethanes, acrylates or MBS.

The polymers are preferably polyphenylene oxides and sulfides and mixtures thereof with styrene polymers or polyamides.

The polymers are preferably polyurethanes which derive from polyethers, polyesters and polybutadienes having both terminal hydroxyl groups and aliphatic or aromatic polyisocyanates, and the precursors thereof.

The polymers are preferably polyamides and copolyamides which derive from diamines and dicarboxylic acids and/or from aminocarboxylic acids or the corresponding lactams, such as nylon 2/12, nylon 4 (poly-4-aminobutyric acid, Nylon® 4, from DuPont), nylon 4/6 (poly(tetramethyleneadipamide), Nylon® 4/6, from DuPont), nylon 6 (polycaprolactam, poly-6-aminohexanoic acid, Nylon® 6, from DuPont, Akulon K122, from DSM; Zytel® 7301, from DuPont; Durethan® B 29, from Bayer), nylon 6/6 ((poly(N,N'-hexamethyleneadipamide), Nylon® 6/6, from DuPont, Zytel® 101, from DuPont; Durethan A30, Durethan® AKV, Durethan® AM, from Bayer; Ultramid® A3, from BASF), nylon 6/9 (poly(hexamethylenenonanamide), Nylon® 6/9, from DuPont), nylon 6/10 (poly(hexamethylenesebacamide), Nylon® 6/10, from DuPont), nylon 6/12 (poly (hexamethylenedodecanediamide), Nylon® 6/12, from DuPont), nylon 6/66 (poly(hexamethyleneadipamide-co-caprolactam), Nylon® 6/66, from DuPont), nylon 7 (poly-7-aminoheptanoic acid, Nylon® 7, from DuPont), nylon 7,7 (polyheptamethylenepimelamide, Nylon® 7,7, from DuPont), nylon 8 (poly-8-aminooctanoic acid, Nylon® 8, from DuPont), nylon 8,8 (polyoctamethylenesuberamide, Nylon® 8,8, from DuPont), nylon 9 (poly-9-aminononanoic acid, Nylon® 9, from DuPont), nylon 9,9 (polynonamethyleneazelamide, Nylon® 9,9, from DuPont), nylon 10 (poly-10-aminodecanoic acid, Nylon® 10, from DuPont), nylon 10,9 (poly(decamethyleneazelamide), Nylon® 10,9, from DuPont), nylon 10,10 (polydecamethylenesebacamide, Nylon® 10,10, from DuPont), nylon 11 (poly-11-aminoundecanoic acid, Nylon® 11, from DuPont), nylon 12 (polylauryllactam, Nylon® 12, from DuPont, Grillamid® L20, from Ems Chemie), aromatic polyamides proceeding from m-xylene, diamine and adipic acid; polyamides prepared from hexamethylenediamine and iso and/or terephthalic acid (polyhexamethyleneisophthalamide, polyhexamethyleneterephthalamide) and optionally an elastomer as a modifier, e.g. poly-2,4,4-trimethylhexamethyleneterephthalamide or poly-m-phenyleneisophthalamide. Block copolymers of the aforementioned polyamides with polyolefins, olefin copolymers, ionomers or chemically bonded or grafted elastomers; or with polyethers, for example with polyethylene glycol, polypropylene glycol or polytetramethylene glycol. In addition, EPDM- or ABS-modified polyamides or copolyamides; and polyamides condensed during processing ("RIM polyamide systems").

The polymers are preferably polyureas, polyimides, polyamidimides, polyetherimides, polyesterimides, polyhydantoins and polybenzimidazoles.

The polymers are preferably polyesters which derive from dicarboxylic acids and diaicohols and/or from hydroxycarboxylic acids or the corresponding lactones, such as polyethylene terephthalate, polybutylene terephthalate (Celanex® 2500, Celanex® 2002, from Celanese; Ultradur®, from BASF), poly-1,4-dimethylolcyclohexane terephthalate, polyhydroxybenzoates, and block polyether esters which derive from polyethers with hydroxyl end groups; and also polyesters modified with polycarbonates or MBS.

The polymers are preferably polycarbonates and polyester carbonates.

The polymers are preferably polysulfones, polyether sulfones and polyether ketones.

Preferably, the polymers are crosslinked polymers which derive from aldehydes on the one hand, and phenols, urea or melamine on the other hand, such as phenol-formaldehyde, urea-formaldehyde and melamine-formaldehyde resins.

The polymers are preferably drying and nondrying alkyd resins,

The polymers are preferably unsaturated polyester resins which derive from copolyesters of saturated and unsaturated dicarboxylic acids with polyhydric alcohols, and vinyl compounds as crosslinking agents, and also the halogenated, flame-retardant modifications thereof.

The polymers preferably comprise crosslinkable acrylic resins which derive from substituted acrylic esters, for example from epoxy acrylates, urethane acrylates or polyester acrylates.

Preferably, the polymers are alkyd resins, polyester resins and acrylate resins which have been crosslinked with melamine resins, urea resins, isocyanates, isocyanurates, polyisocyanates or epoxy resins.

The polymers are preferably crosslinked epoxy resins which derive from aliphatic, cycloaliphatic, heterocyclic or aromatic glycidyl compounds, for example products of bisphenol A diglycidyl ethers, bisphenol F diglycidyl ethers, which are crosslinked by means of customary hardeners, for example anhydrides or amines, with or without accelerators.

The polymers are preferably mixtures (polyblends) of the above mentioned polymers, for example PP/EPDM (polypropylene/ethylene-propylene-diene rubber), polyamide/EPDM or ABS (polyamide/ethylene-propylene-diene rubber or acrylonitrile-butadiene-styrene), PVC/EVA (polyvinyl chloride/ethylene-vinyl acetate), PVC/ABS (polyvinyl chloride/acrylonitrile-butadiene-styrene), PVC/MBS (polyvinyl chloride/methacrylate-butadiene-styrene), PC/ABS (polycarbonate/acrylonitrile-butadiene-styrene). PBTP/ABS (polybutylene terephthalate/acrylonitrile-butadiene-styrene), PC/ASA (polycarbonate/acrylic ester-styrene-acrylonitrile), PC/PBT (polycarbonate/polybutylene terephthalate), PVC/CPE (polyvinyl chloride/chlorinated polyethylene), PVC/acrylate (polyvinyl chloride/acrylate, POM/thermoplastic PUR (polyoxymethylene/thermoplastic polyurethane), PC/thermoplastic PUR (polycarbonate/thermoplastic polyurethane), POM/acrylate (polyoxymethylene/acrylate), POM/MBS (polyoxyrnethylene/methacrlate-butadiene-styrene), PPO/HIPS (polyphenylene oxide/high-impact polystyrene), PPO/PA 6,6 (polyphenylene oxide/nylon 6,6) and copolymers, PA/HDPE (polyamide/high-density polyethylene), PA/PP (polyamide/polyethylene), PA/PPO (polyamide/polyphenylene oxide), PBT/PC/ABS. (polybutylene terephthalate/polycarbonate/acrylonitrile-butadiene-styrene) and/or PBT/PET/PC (polybutylene terephthalate/polyethylene terephthalate/polycarbonate).

Suitable compounding units for production of polymer moldingcompositions are single-shaft extruders or single-screw extruders, for example from Berstorff GmbH, Hanover and/or from Leistritz, Nuremberg.

Suitable compounding units are multizone screw extruders With three-zone screws and/or short compression screws.

Suitable compounding units are also co-kneaders, for example from Coperion Buss Compounding Systems, Prattein, Switzerland, e.g. MDK/E46-11D and/or laboratory kneaders (MDK 46 from Buss, Switzerland with L=11D).

Suitable compounding units are twin-screw extruders, for example from Coperion Werner & Pfleiderer GmbH & Co. KG, Stuttgart (ZSK 25, ZSK 30, ZSK 40, ZSK 58, ZSK MEGAcompounder 40, 50, 58, 70, 92, 119, 177, 250, 320, 350, 380) and/or from Berstorff GmbH, Hanover, Leistritz Extrusionstechnik GmbH, Nuremberg.

Usable compounding units are also ring extruders, for example from 3+Extruder GmbH, Laufen, with a ring of three to twelve small screws which rotate about a static core, and/or planetary gear extruders, for example from Entex, Bochum, and/or vented extruders and/or cascade extruders and/or Maillefer screws.

Suitable compounding units are compounders with a contrarotatory twin screw, for example Compex 37 and 70 models from Krauss-Maffei Berstorff.

Effective screw lengths (L) in the case of single-shaft extruders or single-screw extruders are 20 to 40D, and in the case of multizone screw extruders, for example, 25D with intake zone (L=10D), transition zone (L=6D), ejection zone (L=9D); in the case of twin-screw extruders 8 to 48D.

Production, processing and testing of flame-retardant polymer molding compositions and polymer moldings The flame-retardant components were mixed with the polymer pellets and any additives and incorporated in a twin-screw extruder (model: Leistritz LSM 30/34) at temperatures of 230 to 260° C. (PBT-GR) or of 260 to 280° C.

(PA 66-GR). The homogenized polymer strand was drawn off, cooled in a water bath and then pelletized.

After sufficient dryind, the molding compositions were processed on an injection molding machine (model: Aarburg Allrounder) at melt temperatures of 240 to 270° C. (PBT-GR) or of 260 to 290° C. (PA 66-GR) to give test specimens.

Test specimens of each mixture were used to determine the UL 94 fire class (Underwriter Laboratories) on specimens of thickness 1.5 mm.

The UL 94 Fire Classifications Are as Follows:

V-0: afterflame time never longer than 10 sec, total of afterflame times for 10 flame applications not more than 50 sec. no flaming drops, no complete consumption of the specimen, afterglow time for specimens never longer than 30 sec after end of flame application V-1: afterflame time never longer than 30 sec after end of flame application, total of afterflame times for 10 flame applications not more than 250 sec, afterglow time for specimens never longer than 60 sec after end of flame application, other criteria as for V-0

V-2: cotton indicator ignited by flaming drops, other criteria as for V-1 Not classifiable (ncl): does not comply with fire class V-2, Test of Thermal Stability and Phosphine Formation An important criterion for the thermal stability of the inventive flame retardant mixtures comprising flame retardant and aluminum phosphites is the temperature at which decomposition occurs and toxic $PH_3$ is formed. The release thereof in the course of production of flame-retardant polymers must be avoided. For the determination, a material sample is heated in a tubular oven under flowing nitrogen (30 l/g), by raising the temperature stepwise. The decomposition temperature has been attained when a Drager detection tube can detect more than 1 ppm $PH_3$ (short-term tube for hydrogen phosphide).

Determination of the Content of Water of Crystallization (Residual Moisture Content)

A sample is heated to constant weight in a Nabertherm muffle furnace heated to 300° C. This typically takes 15 minutes. The mass of the residue based on the starting weight, calculated in percent and subtracted from 100, gives the weight loss.

The invention is illustrated by the examples which follow.

EXAMPLE 1

Aluminum Phosphite of the Formula (I)

573 g of aluminum hydroxide, 1284 g of 70% by weight phosphorous acid, 307 g of 25% by weight sulfuric acid and 9400 g of demineralized water are initially charged in a 16 l high-pressure stirred vessel, heated to 150° C. and stirred for 2.5 h. The resulting suspension is discharged, filtered at 80° C. and washed repeatedly with demineralized water, then dried at 220° C. In a very high yield (99%), aluminum phosphite of the formula (I) is obtained with very high thermal stability ($PH_3$ formation from 360° C.).

EXAMPLE 2

Aluminum Phosphite of the Formula (I)

As in example 1, 593 g of aluminum hydroxide, 1330 g of 70% by weight phosphorous acid, 318 g of 25% by weight sulfuric acid and 9 liters of demineralized water are initially charged, heated to 145° C. and stirred for 3 h, then 605 g of 25% by weight sodium hydroxide solution are added and the mixture is stirred for 1.5 h. As in example 1, the suspension is discharged, filtered, washed and dried. In a very high yield (99%), aluminum phosphite of the formula (I) is obtained with very high thermal stability ($PH_3$ formation from 380° C.).

EXAMPLE 3

Aluminum Phosphite of the Formula (II)

2958 g of water are initially charged in a 16 l high-pressure stirred vessel, heated to 155° C. and stirred. Over the course of 3 h, 3362 g of aluminum sulfate solution and 2780 g of sodium phosphite solution are metered in simultaneously. The suspension is discharged and filtered at 80° C, washed with hot water, redispersed and washed once again. The filtercake is dried in a Reaktotherm drier at 220° C. In a very high yield, an inventive mixed alkali metal/aluminum phosphite is obtained with very high thermal stability ($PH_3$ formation from 380° C.).

EXAMPLE 4

Aluminum Phosphite of the Formula (II)

Analogously to example 3, water is initially charged at 155° C. and aluminum sulfate solution and sodium phosphite solution are metered in within 0.5 h. The yield is 85% and the thermal stability ($PH_3$ formation from 360° C.) of the product is very high.

EXAMPLE 5

Aluminum Phosphite of the Formula (III)

1644 g of aluminum hydroxide (Hydral® 710; ALCOA; 99.6%) are initially charged in a kneader. While mixing, 2635 g of phosphorous acid (98%) are added in portions. A reaction occurs spontaneously with evolution of heat. The mixture is left to react at 145° C. for a further 5 h. This gives, in 99.5% yield, aluminum hydrogenphosphite of the composition $Al_2(HPO_3)_{2.89}(H_2PO_3)_{0.22}$. The thermal stability is very high ($PH_3$ formation from 360° C.).

EXAMPLE 6

Aluminum Phosphite of the Formula (III)

As in example 5, 1537 g of aluminum hydroxide and 2463 g of phosphorous acid are reacted. The product contains aluminum hydrogenphosphite of the composition $Al_2(HPO_3)_2(H_2PO_3)_2$, and 0.45% phosphorous acid. The yield is 90.5%. The thermal stability is very high ($PH_3$ formation from 360° C.).

EXAMPLE 7

Mixture of Aluminum Phosphite of the Formula (III) with Aluminum Salt 1600 g of aluminum hydroxide (Hydral® 710; ALCOA; 99.6%) are initially charged in a kneader. While mixing, 2570 g of phosphorous acid (98%) are added in portions. A reaction occurs spontaneously with evolution of heat. The mixture is left to react at 148° C. for a further 160 minutes. The product contains 98.1% by weight of aluminum phosphite of the composition $Al_2(HPO_3)_{2.89}(H_2PO_3)_{0.22}$, 1.5% by weight of aluminum hydroxide and 0.25% by weight of unconverted phosphorous acid.

EXAMPLE 8

Mixture of Aluminum Phosphite of the Formula (III) with Aluminum Salt

As in example 7, 1600 g of aluminum hydroxide and 2570 g of phosphorous acid are reacted, The product contains 90.8% by weight of aluminum phosphite of the composition $Al_2(HPO_3)_2 (H_2PO_3)_2$, 8.7% by weight of aluminum hydroxide and 0.4% by weight of phosphorous acid.

EXAMPLE 9

Mixtures of Aluminum Phosphite of the Formula (I) with Sparingly Soluble Aluminum Salts and Nitrogen-free Extraneous Ions 606 g of aluminum hydroxide, 1360 g of 70% by weight phosphorous acid, 325 g of 25% by weight sulfuric acid and 10 liters of demineralized water are initially charged in a 16 l high-pressure stirred vessel from Pfaudler, heated to 155° C. and stirred for 170 minutes. The resulting suspension is discharged, filtered at 80° C. by means of a Seitz pressure filter and repeatedly washed with demineralized water and redispersed, then dried at 150° C. In a very high yield (99%), an inventive mixture of aluminum phosphite of the formula (II) with sparingly soluble aluminum salts (1.3% by weight of aluminum hydroxide) and nitrogen-free extraneous ions (0.1% by weight of sulfate) is obtained with very high thermal stability ($PH_3$ formation from 360° C.).

EXAMPLE 10

Mixtures of Aluminum Phosphite of the Formula (I) with Sparingly Soluble Aluminum Salts and Nitrogen-free Extraneous Ions As in example 9, 634 g of aluminum hydroxide, 1420 g of 70% by weight phosphorous acid, 340 g of 25% by weight sulfuric acid and 10 liters of demineralized water are initially charged, heated to 125° C. and stirred for 3 h, then 646 g of 25% by weight sodium hydroxide solution are added and the mixture is stirred for 80 minutes. As in example 9, the suspension is discharged, filtered, washed and dried, In a very high yield (98.9%), an inventive mixture of aluminum phosphite of the formula (III) with sparingly soluble aluminum salts (3% by weight of aluminum hydroxide) and nitrogen-free extraneous ions (0.3% by weight of sodium, 0.1% by weight of sulfate) is obtained with very high thermal stability ($PH_3$ formation from 380° C.).

EXAMPLE 11

Comparative

Noninventive, commercially available aluminum phosphite shows a lower thermal stability in comparison ($PH_3$ formation from 320° C.).

EXAMPLE 12

Aluminum Phosphite of the Formula (I) in Polyamide

52% by weight of nylon 6,6 polymer, 28% by weight of glass fibers, 3.9% by weight of aluminum phosphite according to example 1 and 16.1% by weight of Exolit® OP1230 aluminum diethylphosphinate (from Clariant) are used in accordance with the general methods specified to produce flame-retardant polymer molding compositions and flame-retardant polymer moldings in the form of UL-94 test specimens. The UL-94 test gives V-0 classification.

EXAMPLE 13

Aluminum Phosphite of the Formula (I) in Polyester

52% by weight of polybutylene terephthalate polymer, 28% by weight of glass fibers, 3.9% by weight of aluminum phosphite according to example 1 and 16,1% by weight of Exolit® OP1240 aluminum diethylphosphinate (from Clariant) are used in accordance with the general methods specified to produce flame-retardant polymer molding compositions and flame-retardant polymer moldings in the form of UL-94 test specimens. The UL-94 test gives V-0 classification.

EXAMPLE 14

Aluminum Phosphite of the Formula (II) in Polyamide

52% by weight of nylon 6,6 polymer, 28% by weight of glass fibers, 3.9% by weight of aluminum phosphite according to example 3 and 16.1% by weight of Exolit® OP1230 aluminum diethylphosphinate (from Clariant) are used in accordance with the general methods specified to produce flame-retardant polymer molding compositions and flame-retardant polymer moldings in the form of UL-94 test specimens. The UL-94 test gives V-0 classification.

EXAMPLE 15

Aluminum Phosphite of the Formula (II) in Polyester

52% by weight of polybutylene terephthalate polymer, 28% by weight of glass fibers, 3.9% by weight of aluminum phosphite according to example 3 and 16.1% by weight of Exolit® OP1240 aluminum diethylphosphinate (from Clariant) are used in accordance with the general methods specified to produce flame-retardant polymer molding compositions and flame-retardant polymer moldings in the form of UL-94 test specimens The UL-94 test gives V-0 classification,

EXAMPLE 16

Aluminum Phosphite of the Formula (III) in Polyamide

52% by weight of nylon 6,6 polymer, 28% by weight of glass fibers, 3.9% by weight of aluminum phosphite according to example 5 and 16.1% by weight of Exolit® OP1230 aluminum diethylphosphinate (from Clariant) are used in accordance with the general methods specified to produce flame-retardant polymer molding compositions and flame-retardant polymer moldings in the form of UL-94 test specimens. The UL-94 test gives V-0 classification.

EXAMPLE 17

Aluminum Phosphite of the Formula (II) in Polyester

52% by weight of polybutylene terephthalate polymer, 28% by weight of glass fibers, 3.9% by weight of aluminum phosphite according to example 5 and 16.1% by weight of Exolit® OP1240 aluminum diethylphosphinate (from Clariant) are used in accordance with the general methods specified to produce flame-retardant polymer molding compositions and flame-retardant polymer moldings in the form of UL-94 test specimens. The UL-94 test gives V-0 classification.

EXAMPLE 18

Mixture of Aluminum Salt and Aluminum Hydrogenphosphite of the Formula (III) in Polyamide 52% by weight of nylon 6,6 polymer, 28% by weight of glass fibers, 3.9% by weight of a mixture of aluminum salt and aluminum hydrogenphosphite of the formula (III) according to example 7 and 16.1% by weight of Exolit® OP1230 aluminum diethylphosphinate (from Clariant) are used in accordance with the general methods specified to produce flame-retardant polymer molding compositions and flame-retardant polymer moldings in the form of UL-94 test specimens. The UL-94 test gives V-0 classification.

EXAMPLE 19

Mixture of Aluminum Salt and Aluminum Hydrogenphosphite of the Formula (III) in Polyester 52% by weight of polybutylene terephthalate polymer, 28% by weight of glass fibers, 3.9% by weight of a mixture of aluminum salt and aluminum phosphite of the formula (III) according to example 7 and 16.1% by weight of Exolit® OP1240 aluminum diethylphosphinate (from Clariant) are used in accordance with the general methods specified to produce flame-retardant polymer molding compositions and flame-retardant polymer moldings in the form of UL-94 test specimens. The UL-94 test gives V-0 classification.

EXAMPLE 20

52% by weight of nylon 6,6 polymer, 28% by weight of glass fibers, 3.9% by weight of inventive mixture of aluminum phosphite of the formula (I) with sparingly soluble aluminum salts and nitrogen-free extraneous ions according to example 9 and 16.1% by weight of Exolit® OP1230 aluminum diethylphosphinate (from Clariant) are used in accordance with the general methods specified to produce flame-retardant polymer molding compositions and flame-retardant polymer moldings in the form of UL-94 test specimens, The UL-94 test gives V-0 classification.

EXAMPLE 21

52% by weight of polybutylene terephthalate polymer, 28% by weight of glass fibers, 3.9% by weight of inventive mixture of aluminum phosphite of the formula (I) with sparingly soluble aluminum salts and nitrogen-free extraneous ions according to example 10 and 16.1% by weight of Exolit® OP1240 aluminum diethylphosphinate (from Clariant) are used in accordance with the general methods specified to produce flame-retardant polymer molding compositions and flame-retardant polymer moldings in the form of UL-94 test specimens. The UL-94 test gives V-0 classification.

EXAMPLE 22

Comparative

52% by weight of polybutylene terephthalate polymer, 28% by weight of glass fibers, 3.9% by weight of aluminum phosphite from example 11 and 16.1% by weight of Exolit® OP1240 aluminum diethylphosphinate (from Clariant) cannot be processed to give flame-retardant polymer molding compositions and flame-retardant polymer moldings in the form of UL-94 test specimens, due to the formation of toxic phosphine.

The invention claimed is:

1. A flame retardant mixture comprising at least one flame retardant and aluminum phosphites wherein the aluminum phosphites are selected from the group consisting of the formulae (II), (III) and mixtures thereof

$$Al_{2.00}M_z(HPO_3)_y(OH)_v x(H_2O)_w \quad (II)$$

wherein
M is alkali metal ions
z is 0.01 to 1.5
y is 2.63 to 3.5
v is 0 to 2 and
w is 0 to 4,

$$Al_{2.00}(HPO_3)_u(H_2PO_3)_t x(H_2O)_s \quad (III)$$

wherein
u is 2 to 2.99,
t is 2 to 0,01 and
s is 0 to 4,
mixtures of aluminum phosphite of the formula (III) with aluminum salts.

2. The flame retardant mixture as claimed in claim 1, wherein the at least one flame retardant is dialkylphosphinic acids, salts thereof; condensation products of melamine, reaction products of melamine with phosphoric acid, reaction products of condensation products of melamine with polyphosphoric acid or mixtures thereof; nitrogen-containing phosphates of the formulae $(NH_4)_y H_{3-y} PO_4$ and $(NH_4 PO_3)_z$, where y is 1 to 3 and z is 1 to 10 000; benzoguanamine, tris(hydroxyethyl) isocyanurate, allantoin, glycoluril, melamine, melamine cyanurate, dicyandiamide, guanidine; magnesium oxide, calcium oxide, aluminum oxide, zinc oxide, manganese oxide, tin oxide, aluminum hydroxide, boehmite, dihydrotalcite, hydrocalumite, magnesium hydroxide, calcium hydroxide, zinc hydroxide, tin oxide hydrate, manganese hydroxide, zinc borate, basic zinc silicate, zinc stannate or mixtures thereof.

3. The flame retardant mixture as claimed in claim 1, wherein the at least one flame retardant is dialkylphosphinic acids or salts thereof and are of the formula (IV)

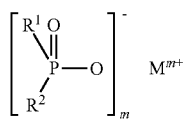

(IV)

wherein
$R^1$, $R^2$ are the same or different and are linear or branched $C_1$-$C_6$-alkyl;
M is Mg, Ca, Al, Sb, Sn, Ge, Ti, Fe, Zr, Zn, Ce, Bi, Sr, Mn, Li, Na, K, H a protonated nitrogen base or mixtures thereof;
m is 1 to 4.

4. The flame retardant mixture as claimed in claim 1, wherein the at least one flame retardant is melam, melem, melon, dimelamine pyrophosphate, melamine polyphosphate, melam polyphosphate, melon polyphosphate, melem polyphosphate and mixed poly salts thereof, ammonium hydrogenphosphate, ammonium dihydrogenphosphate, ammonium polyphosphate or mixtures thereof.

5. The flame retardant mixture as claimed in claim 1, wherein the at least one flame retardant is selected from the group consisting of aluminum hypophosphite, zinc hypophosphite, calcium hypophosphite, sodium phosphite, monophenylphosphinic acid and salts thereof, mixtures of dialkylphosphinic acids and salts thereof, rnonoalkylphosphinic acids and salts thereof, 2-carboxyethylalkylphosphinic acid and salts thereof, 2-carboxyethylmethylphosphinic acid and salts thereof, 2-carboxyethylarylphosphinic acid and salts thereof, 2-carboxyethylphenylphosphinic acid and salts thereof, oxa-10-phosphaphenanthrene (DOPO) and salts thereof, adducts onto para-benzoquinone, itaconic acid and salts thereof.

6. The flame retardant mixture as claimed in claim 1, wherein z in the aluminum phosphite of the formula (II) is 0.15 to 0.4, y is 2.80 to 3, v is 0.1 to 0.4 and w is 0.01 to 0.1.

7. The flame retardant mixture as claimed in claim 1, wherein u in the aluminum phosphite of the formula (III) is 2.834 to 2.99, t is 0.332 to 0.03 and s is 0.01 to 0.1.

8. The flame retardant mixture as claimed in claim 1, comprising 0.1 to 99.9% by weight of the flame retardant and 0.1 to 99.9% by weight of aluminum phosphites of the formulae (II) (III) and mixtures thereof, mixtures of aluminum phosphite of the formula (III) with aluminum salts or mixtures thereof.

9. The flame retardant mixture as claimed in claim 1, comprising 50 to 99.9% by weight of flame retardant and 0.1 to 50% by weight of aluminum phosphites of the formulae (II), (III) and mixtures thereof, mixtures of aluminum phosphite of the formula (III) with aluminum salts or mixtures thereof.

10. A process for preparing flame retardant mixtures comprising aluminum phosphites selected from the group consisting of the formulae (II), (III) and mixtures thereof $$Al2.00M_z(HPO_3)_y(OH)_v x(H_2O)_w \quad (II)$$

wherein
M is alkali metal ions
z is 0.01 to 1.5
y 2.63 to 3.5
v is 0 to 2 and
w is 0 to 4,

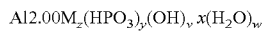

wherein
u is 2 to 2.99,
t is 2 to 0.01 and
s is 0 to 4,
comprising the step of mixing pulverulent flame retardants with pulverulent aluminum phosphites of the formulae (II), (III) and mixtures thereof, mixtures of aluminum phosphite of the formula (III) with aluminum salts or mixtures thereof.

11. An intermediate for further syntheses, a binder, a crosslinker or accelerator in the curing of epoxy resins, polyurethanes, unsaturated polyester resins, polymer stabilizer, a crop protection composition, a sequestrant, a mineral oil additive, an anticorrosive, a washing composition a cleaning composition or an electronic composition comprising a flame retardant mixture comprising a flame retardant and aluminum phosphites wherein the aluminum phosphites are selected from the group consisting of the formulae (II), (III) and mixtures thereof $$Al_{2.00}M_z(HPO_3)_y(OH)_v x(H_2O)_w \quad (II)$$

wherein
M is alkali metal ions
z is 0.01 to 1.5
y is 2.63 to 3.5
v is 0 to 2 and
w is 0 to 4, $$Al_{2.00}(HPO_3)_u(H_2PO_3)_t x(H_2O)_s \quad (III)$$

wherein
u is 2 to 2.99,
is 2 to 0.01 and
s is 0 to 4,
mixtures of aluminum phosphite of the formula (III) with aluminum salts.

12. A flame retardant, a flame retardant for clearcoats and intumescent coatings, a flame retardant for wood and other cellulosic products, a reactive and nonreactive flame retardants for polymers, a flame-retardant polymer molding composition, a flame-retardant for rendering polyester and pure and blended cellulose fabrics flame-retardant by impregnation, a synergist or a synergist in further flame retardant mixtures comprising a flame retardant mixture comprising a flame retardant and aluminum phosphites
wherein the aluminum phosphites are selected from the group consisting of the formulae (I) (II), (III) and mixtures thereof $$Al_{2.00}M_z(HPO_3)_y(OH)_v x(H_2O)_w \quad (II)$$

wherein
M is alkali metal ions
z is 0.01 to 1.5
y is 2,63 to 3.5
v is 0 to 2 and
w is 0 to 4, $$Al_{2.00}(HPO_3)_u(H_2PO_3)_t x(H_2O)_s \quad (III)$$

wherein
u is 2 to 2.99,
t is 2 to 0.01 and
s is 0 to 4,
mixtures of aluminum phosphite of the formula (III) with aluminum salts.

13. A flame-retardant thermoplastic or thermoset polymer molding composition or polymer molding, film, filament or fiber comprising 0.1 to 45% by weight of a flame retardant mixture comprising at least one flame retardant and aluminum phosphites wherein the aluminum phosphites are

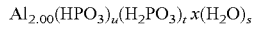

selected from the group consisting of the formulae (II), (III) and mixtures thereof $$Al_{2.00}M_z(HPO_3)_y(OH)_v \cdot x(H_2O)_w \quad (II)$$

wherein
M is alkali metal ions
z is 0.01 to 1.5
y is 2.63 to 3.5
v is 0 to 2 and
w is 0 to 4, $$Al_{2.00}(HPO_3)_u(H_2PO_3)_t \cdot x(H_2O)_s \quad (III)$$

wherein
is 2 to 2.99,
is 2 to 0.01 and
is 0 to 4,
mixtures of aluminum phosphite of the formula (III) with aluminum salts, 55 to 99.9% by weight of thermoplastic or thermoset polymer or mixtures thereof, 0 to 55% by weight of additives and 0 to 55% by weight of filler or a reinforcing material, where the sum of the components is 100% by weight.

14. A flame-retardant thermoplastic or thermoset polymer molding composition or polymer molding, film, filament or fiber comprising 1 to 30% by weight of a flame retardant mixture comprising at least one flame retardant and aluminum phosphites wherein the aluminum phosphites are selected from the group consisting of the formulae (II), (III) and mixtures thereof $$Al_{2.00}M_z(HPO_3)_y(OH)_v \cdot x(H_2O)_w \quad (II)$$

wherein
M is alkali metal ions
z is 0.01 to 1.5
y is 2.63 to 3.5
v is 0 to 2 and
w is 0 to 4, $$Al_{2.00}(HPO_3)_u(H_2PO_3)_t \cdot x(H_2O)_s \quad (III)$$

wherein
u is 2 to 2.99,
t is 2 to 0.01 and
s is 0 to 4,
mixtures of aluminum phosphite of the formula (III) with aluminum salts. 10 to 97% by weight of thermoplastic or thermoset polymer or mixtures thereof, 1 to 30% by weight of additives and 1 to 30% by weight of filler or a reinforcing material, where the sum of the components is 100% by weight.

15. A flame-retardant thermoplastic or thermoset polymer molding composition or polymer molding, film, filament or fiber comprising a flame retardant mixture comprising at least one flame retardant and aluminum phosphites wherein the aluminum phosphites are selected from the group consisting of the formulae (II), (III) and mixtures thereof $$Al_{2.00}M_z(HPO_3)_y(OH)_v \cdot x(H_2O)_w \quad (II)$$

wherein
M is alkali metal ions
z is 0.01 to 1.5
y is 2.63 to 3.5
v is 0 to 2 and
w is 0 to 4, $$Al_{2.00}(HPO_3)_u(H_2PO_3)_t \cdot x(H_2O)_s \quad (III)$$

wherein
u is 2 to 2.99,
t is 2 to 0.01 and
s is 0 to 4,
mixtures of aluminum phosphite of the formula (III) with aluminum salts wherein the polymer is a thermoplastic polymer of the HI (high-impact) polystyrene, polyphenylene ether, polyamide, polyester or polycarbonate type, blends or polymer blends of the ABS (acrylonitrile-butadiene-styrene), PC/ABS (polycarbonate/acrylonitrile-butadiene-styrene), PPE/HIPS (polyphenylene ether/HI polystyrene) polymer type, thermoset polymers of the unsaturated polyester or epoxy resin type or mixtures thereof.

* * * * *